United States Patent
Floyd et al.

(10) Patent No.: US 9,254,065 B2
(45) Date of Patent: Feb. 9, 2016

(54) WONDER SPATULA

(76) Inventors: Larry Floyd, Nashville, TN (US);
Harriet Floyd, Nashville, TN (US)

(*) Notice: Subject to any disclaimer, the term of this patent is extended or adjusted under 35 U.S.C. 154(b) by 0 days.

(21) Appl. No.: 13/154,507

(22) Filed: Jun. 7, 2011

(65) Prior Publication Data
US 2012/0043774 A1   Feb. 23, 2012

Related U.S. Application Data

(60) Provisional application No. 61/374,293, filed on Aug. 17, 2010.

(51) Int. Cl.
*B25B 7/00* (2006.01)
*B25B 9/00* (2006.01)
*A47J 43/28* (2006.01)

(52) U.S. Cl.
CPC ..................... *A47J 43/283* (2013.01)

(58) Field of Classification Search
CPC ......... A47G 21/10; A47J 43/283; B65G 7/12; B25B 9/02; C03B 35/20
USPC .............. 294/3, 7–11, 16, 99.2, 118; D7/686; 7/110, 116, 167, 168; 292/95, 96, 194, 292/195, DIG. 63, 288; 30/262
See application file for complete search history.

(56) References Cited

U.S. PATENT DOCUMENTS

| | | | | |
|---|---|---|---|---|
| 1,723,597 A | * | 8/1929 | Bannister | 294/106 |
| 1,945,165 A | * | 1/1934 | Smith | 99/441 |
| 2,544,197 A | * | 3/1951 | Vosbikian et al. | 30/262 |
| 2,827,847 A | * | 3/1958 | Shafter | 99/402 |
| 2,864,645 A | * | 12/1958 | Meldrum | 294/106 |
| 3,361,468 A | * | 1/1968 | Case | 294/8 |
| 4,002,365 A | | 1/1977 | Rader | |
| 4,580,909 A | | 4/1986 | McIntosh | |
| 4,904,009 A | | 2/1990 | Kozlinski | |
| D310,946 S | * | 10/1990 | White | D7/683 |
| 5,551,741 A | | 9/1996 | LaBoccetta | |
| 5,601,323 A | | 2/1997 | Kaiser | |
| 5,934,721 A | | 8/1999 | Walde | |
| 6,446,344 B1 | * | 9/2002 | Gontar | 30/262 |
| 6,574,870 B1 | * | 6/2003 | Huang | 30/252 |
| D478,791 S | * | 8/2003 | Clark | D7/686 |
| D526,543 S | * | 8/2006 | Mullen | D7/686 |
| 7,404,822 B2 | * | 7/2008 | Viart et al. | 606/208 |
| 2009/0121062 A1 | * | 5/2009 | Silver et al. | 241/168 |

* cited by examiner

*Primary Examiner* — Stephen Vu
(74) *Attorney, Agent, or Firm* — Daniel Boudwin; Global Intellectual Property Agency, LLC

(57) ABSTRACT

A cooking utensil for turning grilled, fried or otherwise cooked items without risk of dropping or breaking the foodstuff. The utensil has two pivotally connected handles, joined by a spring-loaded hinge at one terminus. Each handle is equipped with a large, fan-shaped wire spatula for grasping food. The fan-shaped spatulas are large enough to grasp food items without risk of portions breaking or falling off. Further, the utensil is equipped with a hook and eye closure mechanism to secure the spatulas together when not in use. The device may also have metal prongs extending from the outer edges of the spatulas to better grasp foodstuffs.

4 Claims, 2 Drawing Sheets

WONDER SPATULA

CROSS REFERENCE TO RELATED APPLICATION

This application claims the benefit of U.S. Provisional Application No. 61/374,293 filed on Aug. 17, 2010, entitled "Wonder Spatula."

BACKGROUND OF THE INVENTION

1. Field of the Invention

The present invention relates to food handling tongs and particularly to food handling tongs which are in the form of a pair of extra wide, spring loaded spatulas for ease in handling grilled foodstuffs.

Barbecuing or grilling food allows a wide range of foodstuffs to be cooked, such as burgers, hot dogs, chicken, kabobs, ribs, and much more. Grilled food has a distinct, popular flavor and has numerous health benefits. Grilled food has become increasingly popular because of the flavor and the health advantages associated with grilling food as opposed to cooking by other means. The popularity of grilled food among home consumers has also prompted commercial restaurants to offer an increasing number of grilled menu items.

Despite the advancement in popularity of grilled food, cooking utensils currently used for grilling have remained primitive and suffer from several drawbacks. The most common cooking utensil used for grilling is the conventional spatula. However, turning an item of food on the grill using a spatula is difficult, as the spatula must be slid between the grill surface and the food item. Often times a user may have difficulty cleanly picking up food from the grill surface. The spatula also does not allow one to easily check how completely cooked an item is without a series of flips. When cooking delicate food items, repeated flipping with a spatula can deteriorate the integrity and appearance of the food.

Another commonly used utensil for grilling is the conventional set of traditional kitchen tongs. Such conventional tongs are not well suited for many commonly grilled foodstuffs. Use of such tongs often causes the same problems as the spatula when picking up or separating food items from a grill surface. Further, because of the directionality of the tongs, use in grilling requires the operator to manipulate the operating hand in an uncomfortable wrist position when handling the food.

There is currently no single utensil that is well suited for all types of foodstuffs that may be cooked on a grill simultaneously. The present invention addresses this need. Consequently, the present invention contemplates a combination spatula and tong device for grilling and cooking purposes.

2. Description of the Prior Art

Several patents have been granted dealing with cooking and grilling utensils. However, such patents have not addressed the issue of handling larger grilled food items. Such inventions have focused on grease removal or serve as an all in one grilling and cleaning tool. Thus, while several cooking and grilling utensils exist in the prior art, there remains a need for a single utensil that is useful for preparing the full variety of foods that may be cooked on a grill, and one that does not suffer from the drawbacks of currently available devices. The present invention is a cooking tool that allows easier maneuvering of food and inspection thereof.

Several patents have issued for general grilling tongs or spatulas. Rader U.S. Pat. No. 4,002,365 is directed to tongs for handling food items upon a grill in which the food gripping parts of the tongs are displaced laterally as well as apart when opened to enable the user of the tongs to see the food item as it is being gripped by the tongs. Similarly, Mullen U.S. Design Patent No. D526,543 is directed to an ornamental design for a dual spatula with wide thongs. Kaiser U.S. Pat. No. 5,601,323 is similarly directed to a cooking tong apparatus for handling food items on a grill. The cooking tong apparatus has a first and second jaw for gripping, wherein each jaw has a plurality of tines that are properly spaced apart and sized to fit between standard grill slats. The cooking tong apparatus has a first and second handle that lie in a horizontal plane, allowing a user to operate the cooking tong apparatus in a manner that is most comfortable for the user's hand and wrist. The Rader, Mullen and Kaiser inventions provide slight variations on general-purpose tongs, but fail to address the issues related to the grilling of larger food items. The present invention provides wider, fan shaped tongs that permit the flipping of any grilled foodstuff without the risk of deteriorating integrity or appearance of the food.

McIntosh U.S. Pat. No. 4,580,909 is directed to a food-handling device and probe for determining the interior temperature of the food being handled. The device resembles a pair of tongs that not only carry a temperature-sensing probe with visual signal and gauge, but also carry a structure that positions the probe into the middle of the food being gripped by the tongs. Thus, the device senses the food article's temperature at the midpoint of its thickness, providing improved and reliable information as to the thoroughness of the cooking. The McIntosh invention addresses the issue of thoroughly cooking a food item and inspecting the temperature thereof, but fails to address the issue of an improved means for turning or flipping larger grilled items.

Other patents are directed to removing excess grease from cooking food by compression. Kozlinski U.S. Pat. No. 4,904,009 is directed to food handling tongs that include opposing upper and lower plates pivotally mounted. The upper plate provides a plurality of apertures surrounded by upwardly facing conical portions. The lower plate is provided with a plurality of similar apertures, each surrounded by downward facing conical portions. In use, food is pressed between the upper and lower plates, causing the fat and grease to be squeezed out of the food and directed through the apertures in the upper and lower plates. The goal is to reduce the fat content of the food, providing a healthier diet. Similarly, LaBoccetta U.S. Pat. No. 5,551,741 is directed to a food handling spatula-tong device that provides a means of picking up food and expressing excess oil or fat from the food prior to serving. The spatula-tong device is comprised of a pair of pivotally connected members with food compressing members mounted to an end of each pair of the pivotally connected members. Each of the food-compressing members is provided with apertures that are not aligned with apertures along the opposite compressing member. Both rectangular and triangularly shaped compressing members are utilized to adapt the tongs to various types of foods, including pizza. The compressing plates may be interchangeably and removeably mounted to the tongs. The upper plate is pivotally mounted to the tongs to provide maximum compressing force.

Both the Kozlinski and LaBoccetta inventions address the issue of healthier cooking through the removal of grease from grilled food. They both compress the food to drain excess grease and fat. However, both do not address the need for an improved means of turning or flipping larger food items, as described by the present invention does.

Other inventions have been directed to multipurpose grilling tools. Walde U.S. Pat. No. 5,934,721 is directed to a multi-functional adjustable grip barbeque tong assembly with an adjustable separation limiter that controls how far apart the handles separate. The assembly includes a dual-spatula tong, beveled cutting edges, tines that fit between and below the slats of a barbeque grill, and recesses to scrape a grill clean. The dual spatula assemblies are connected to one another by a spring action U-clip that has a limiting bolt running through the two legs. The further the limiting bolt is threaded into a threaded aperture, the closer the two legs are pulled together, thereby decreasing the distance between the connected handles and making the tongs easier to manage. The Walde invention addresses many issues related to grilling, including general cooking and cleaning of the grill, however, it does not provide a device that ensures proper flipping and turning of larger items.

While the above-mentioned devices are suited for their intended usages, none of these devices disclose a food-handling utensil having large, fan shaped set of opposing upper and lower wire spatulas for the turning and flipping larger food items. Inasmuch as the art is relatively crowded with respect to these various types of tongs, it can be appreciated that there is a continuing need for, and interest in, improvements to grilling devices. In this respect, the present invention addresses this need and interest.

SUMMARY OF THE INVENTION

In view of the foregoing disadvantages inherent in the known types of grilling tongs and spatulas now present in the prior art, the present invention provides a new, spring loaded, wide-gripping spatula tong wherein the same can be utilized for providing convenience for the user when turning or flipping a variety of foodstuffs.

Many foods require turning or flipping while being cooked, fried, or grilled to ensure that the food is evenly and thoroughly cooked from both sides. Those preparing the food may be required to lift the food with a spatula to check that a side is fully cooked or to flip the foodstuffs over to allow searing or cooking of a second side. During this process, foodstuffs may slide from the spatula, fall to the ground or slide between grill slats. This renders the food unusable, wasting food and money. To alleviate the problem, tongs may be used in place of spatulas; however, tongs only grip a small region of the food, which may cause the sides of the foodstuff to break off or crumble, resulting in integrity and appearance damage to the food. The small surface area provided by the tongs creates stress concentration on the food product, which may have varying consistency and rigor. The present invention provides an effective solution to handling foodstuffs on a cooking surface.

The device comprises a dual set of wide, cradle-shaped spatulas that grasp food therebetween and make griping and flipping of foodstuffs much less difficult. The handles are spring biased to promote the expansion of the gap between spatulas prior to gripping food.

The present invention is designed to prevent accidental dropping of foods that require turning while being cooked, grilled, or fried. The device features a cooking utensil having two spring-loaded handles that connect to a set of large, fan-shaped, wire spatulas. The outer edge of spatulas curve slightly to allow the two to mate when clamped together. When in use, the spatulas clamp onto the food for a secure grip thereof, ensuring that even large foodstuffs will not be dropped or break during the flipping or turning process. The large surface area afforded by the opposing spatulas improves the user's ability to handle large food items without breakage or risk of spillage. The practitioner gains better control over the cooking process through the utilization of the present invention, which provides improves means for turning over foods on a cooking surface.

Accordingly, it is an object of this invention to provide pivotally connected set of spatulas for grasping and turning food items on a cooking surface, enabling the user of the spatulas to easily grip the food item and flip it without risk of dropping or breaking the item.

Other objects, features and advantages of the present invention will become apparent from the following detailed description taken in conjunction with the accompanying drawings.

BRIEF DESCRIPTIONS OF THE DRAWINGS

DETAILED DESCRIPTION OF THE INVENTION

Figure 1:
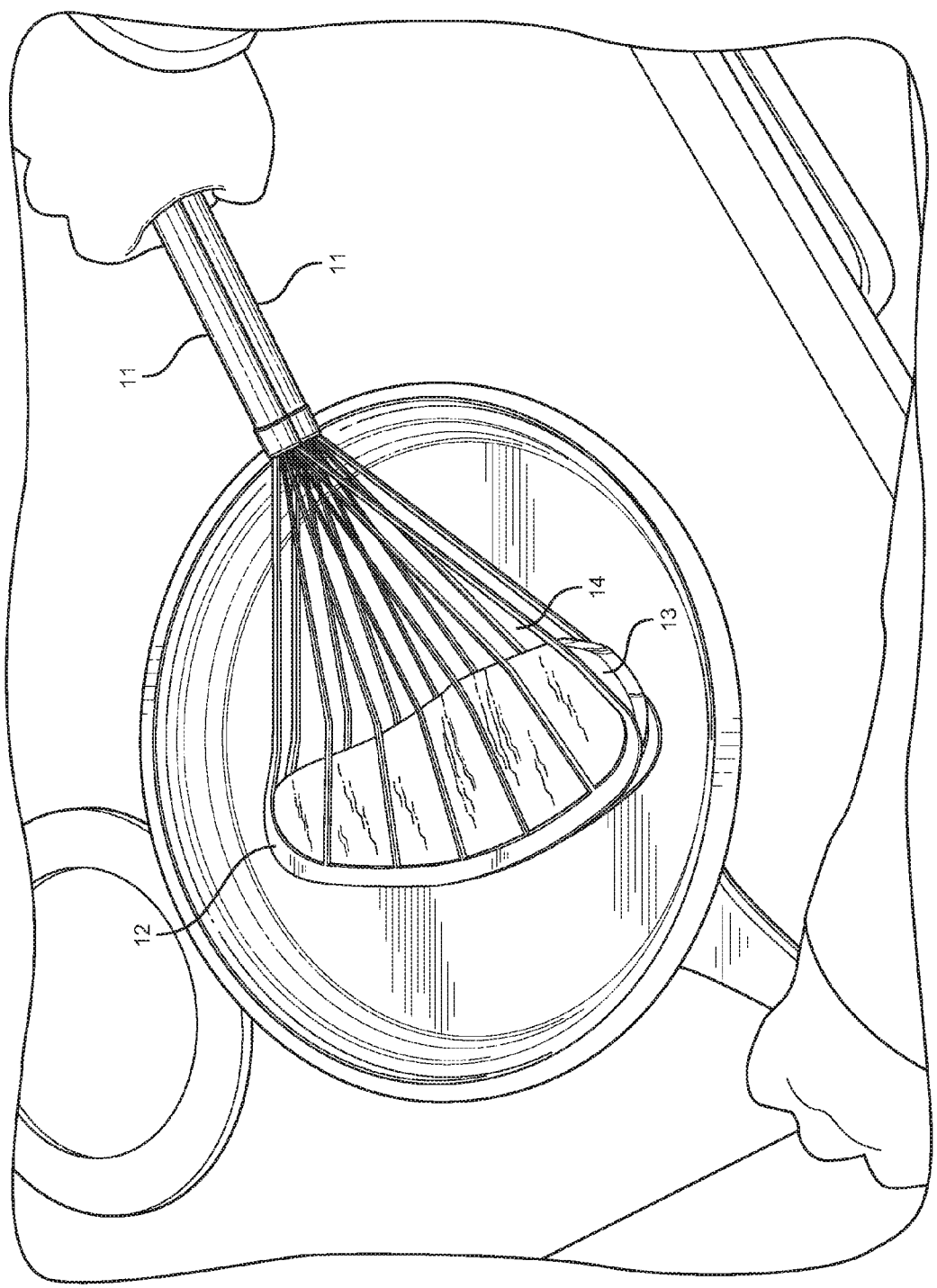
FIG. 1 is a perspective view of the present invention in use, grasping a fried foodstuff between the set of provided spatulas.

Referring now to FIG. 1, there is shown a perspective view of the present invention in use, grasping a fried foodstuff. Two pivotally connected handles 11 are each attached to a large, fan-shaped wire spatula 12 for gripping a cooking foodstuff 13. Voids 14 within the wire spatulas allow the practitioner to view the foodstuff 13 as it is cooking without setting it back on the grill, allowing the desired temperature to be precisely achieved.

Figure 2:
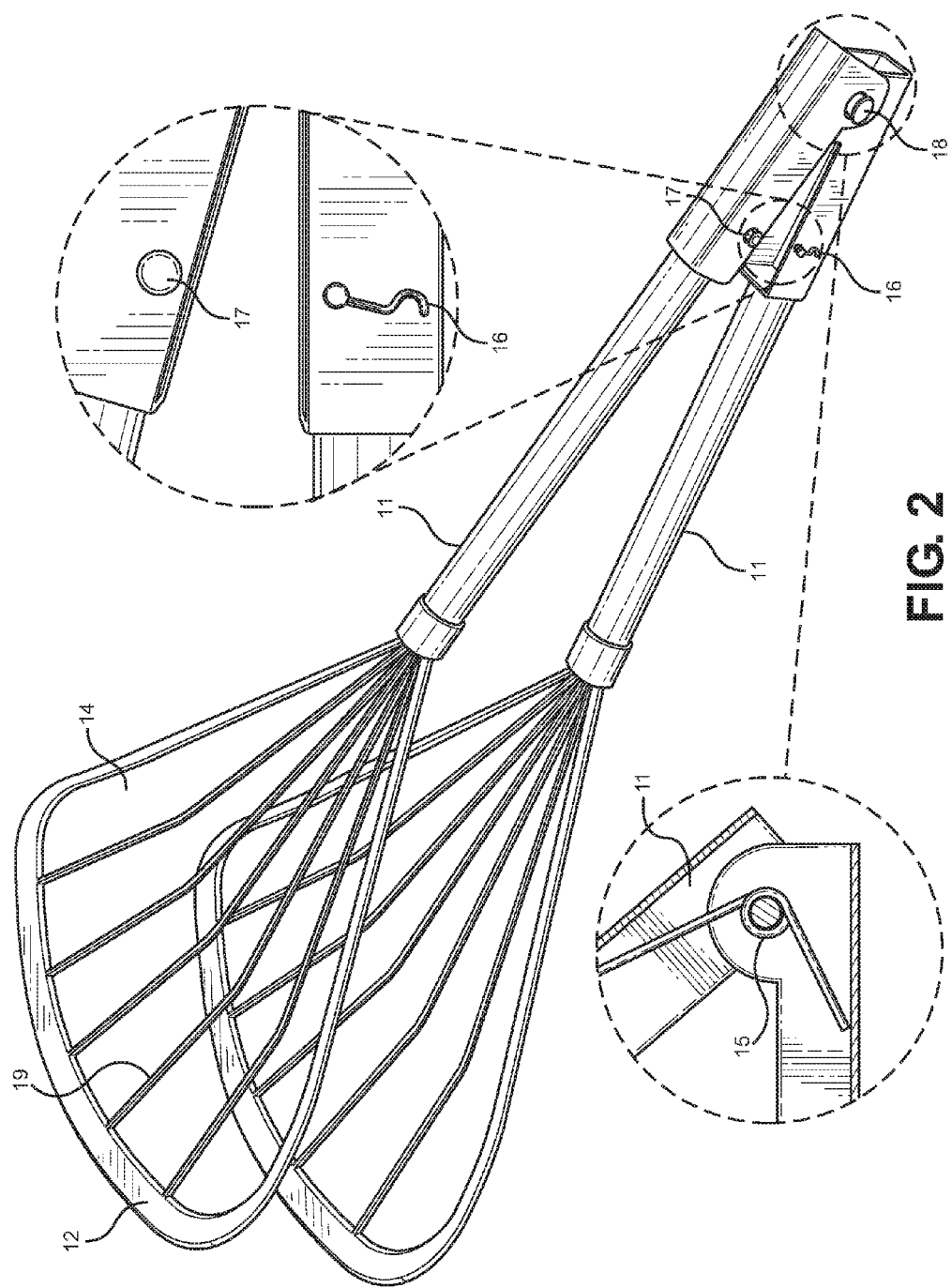
FIG. 2 is a perspective view of the present invention with a first callout showing a perspective view of the locking mechanism and a second callout showing a cutaway view of the spring-loaded hinge of the pivotally connected handles.

Referring now to FIG. 2, there is shown a perspective view of the present invention with a close-up of the handle latch. Two pivotally connected handles 11 are connected at one end via a spring-loaded hinge 15, and held together by a connector pin 18. On the other terminus of each pivotally connected handle 11 is a large, fan-shaped wire spatula 12 for gripping a cooking foodstuff 13. Each wire spatula 12 has numerous voids 14 allowing the foodstuff 13 to be viewed as it is being cooked. Further, the spring-loaded hinge 15 is equipped with a hook 16 and an eye 17 to maintain the device in the closed position when not in use.

In use, the present invention is designed to prevent users from dropping meats and other foodstuffs that require turning while cooking, grilling, or frying. The present invention comprises a device containing two handles 11, connected by a spring-loaded hinge 15. The handles 11 may measure an adequate length to allow the user to grasp the article of food without placing his or her hands in a close proximity to the cooking means, thereby preventing inadvertent burning of the user's hands while in operation. At the end of each handle 11 is an identical, fan-shaped spatula 12 with numerous voids 14 to allow the user to view the foodstuff 13 surface as it is being turned. The edges of the spatulas 12 are slightly curved in an upward direction, out of plane from the rest of the spatula. This curve provides the user with an improved angle to slip the spatula between the food and a cooking surface, allowing easier lifting of the food. Alternatively, the spatulas may include several interior prongs 19 that extend from the forward edge of the spatula. The prongs 19 act to securely grip and support food while being held between the spatulas. The aforementioned handles 11 may be round, or alternatively of any acceptable shape desired by the user. A support rings at the base of the spatulas provides support for the cantilevered spatulas and tongs projecting therefrom. At the base of the handles is a spring-loaded hinge 15, containing a hook 16 on a first side and an eye 17 on the opposing side, allowing the device to be locked closed for easy storage when not in use. The spring acts to open the angle at the handle joint, providing easier use of the device when gripping food on a cooking surface.

Further, the wire spatulas 12 of the present invention and the voids 14 within allow the user to judge the completeness of the foodstuff. Additionally, the wide, fan-shaped nature of the spatulas 12 allows large portions of cooking food to be picked up with ease and without risk of breakage or dropping. The spring-loaded hinge 15, assures that the spatulas 12 separate automatically, improving handling easier for the practitioner.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A device, comprising:
   a first handle and a second handle, each comprising a first end and a second end;
   said first handle and said second handle pivotally connected at said first ends via a spring-biased hinge;
   a first spatula extending from said first handle second end;
   a second spatula extending from said second handle second end;
   a locking mechanism adapted to hold said first handle and said second handle in a closed position;
   wherein said first spatula has a curvature forming a non-planar edge and said second spatula has a curvature forming a non-planar edge;
   wherein the curvature of the first spatula matches the curvature of the second spatula such that the non-planar edge of the first spatula rests flush against the non-planar edge of the second spatula when the device is in the closed position.

2. The device of claim 1, wherein said first spatula and said second spatula each comprise a plurality of interior prongs.

3. The device of claim 1, wherein said locking mechanism comprises a hook and eye mechanism.

4. The device of claim 1, wherein each of said first spatula and said second spatula further comprise a tapered proximal portion connected to said second ends of said handles and a wider distal end.

\* \* \* \* \*